United States Patent [19]

Charny

[11] Patent Number: 5,781,531
[45] Date of Patent: Jul. 14, 1998

[54] METHOD AND APPARATUS FOR HIERARCHICAL RELATIVE ERROR SCHEDULING

[75] Inventor: Anna Charny, Sudbury, Mass.

[73] Assignee: Digital Equipment Corporation, Maynard, Mass.

[21] Appl. No.: 578,932

[22] Filed: Dec. 27, 1995

[51] Int. Cl.$^6$ ........................................ H04J 3/02
[52] U.S. Cl. ........................ 370/232; 370/395; 370/468
[58] Field of Search ............................ 370/231, 232, 370/395, 468; 395/673, 674, 287, 293

[56] References Cited

U.S. PATENT DOCUMENTS

| 5,301,333 | 4/1994 | Kuo-Chu | 395/732 |
| 5,506,969 | 4/1996 | Wall | 395/287 |
| 5,533,009 | 7/1996 | Chen | 370/232 |
| 5,533,020 | 7/1996 | Byrn | 370/395 |
| 5,555,244 | 9/1996 | Gupta | 370/397 |
| 5,566,163 | 10/1996 | Petit | 370/230 |
| 5,577,035 | 11/1996 | Hayter | 370/395 |
| 5,619,502 | 4/1997 | Kahn | 370/397 |

FOREIGN PATENT DOCUMENTS 0 669 777 A   8/1995   European Pat. Off. .

OTHER PUBLICATIONS

Motorola/Codex, "Scheduler for Rate Based ABR", Dick Kline, Jul. 27, 1994, pp. 1–7.
IEEE, Hui Zhang, "Service Disciplines For Guaranteed Performance Service In Packet–Switching Networks", pp. 1–23.
IEEE/ACM Transactions on Networking, vol. 3, No. 6, 1 Dec. 1995, pp. 683–689, XP000544172 XIE G G et al: "Delay Guarantee of Virtual Clock Server";
p. 683, col. 2, Line 33–Line 45;
p. 685, col. 1, Line 1 –Line 31;
p. 685, col. 2, Line 7 –Line 24.

*Primary Examiner*—Tod R. Swann
*Assistant Examiner*—Christopher S. Chow
*Attorney, Agent, or Firm*—Ronald C. Hudgens

[57] ABSTRACT

A novel scheduling method is provided which may be used for rate-based scheduling (e.g., for scheduling flows at some assigned rates in a computer network) or for weighted fair sharing of a common resource (e.g., scheduling weighted jobs in a processor). The method is based on hierarchical application of Relative Error (RE) scheduling. The present method of a Hierarchical RE Scheme (HRE) with complexity O(log(N)), where N is the maximum number of jobs supported by the scheduler, is provided.

4 Claims, 4 Drawing Sheets

METHOD AND APPARATUS FOR HIERARCHICAL RELATIVE ERROR SCHEDULING

FIELD OF THE INVENTION

The present invention relates to an improved method and apparatus of rate-based scheduling and weighted fair sharing of a common resource. The problem of rate-based scheduling and weighted fair sharing arise in many different contexts and relate, for example, to the field of computer networks or to processor design. In general, this invention relates to any problem of scheduling jobs according to some rates in a broad context of environments and applications.

BACKGROUND OF THE INVENTION

The problem of scheduling different jobs sharing a common resource occurs in many different contexts. In the most general terms it can be formulated as follows:

A single resource of some kind is shared by several entities indexed by integers i=1,2, ... n. Every entity has a rate R(i) associated with it. The rates are assigned in such a way that sum of all R(i) does not exceed the capacity of the resource. For example, in computer networks the entity is an individual flow, and the shared resource may be a bottleneck communications link or a server capacity. The entities can be served in some service increments, one at a time. For example, the service increment for a network flow is one packet (or cell, in the ATM terminology). A device, called the Scheduler, needs to determine the order of service for different entities so that average service rate received by an entity is its assigned rate R(i). Aside from guaranteeing the long-term average rate, an important goal is to bound the discrepancy between the ideal and the actual service times of each individual service increment, i.e., each packet of each flow.

An example of an environment where such problem occurs is a processor which must schedule jobs competing for its cycles must. If all jobs are of equal importance, then it is desirable to provide all jobs an equal share of the processor capacity. If, however, the jobs have different importance, a possible strategy is to assign weights to all jobs corresponding to their importance, and provide each job a share of processor capacity proportional to the weight assigned to the jobs. In this case the desired service rates are determined by the weights of the flows. An alternative approach might be to assign rates to flows according to some other rule, which is specific to a particular policy and environment of the problem. For example, a rule might be to give some fixed allocation to high priority jobs and then share the remaining bandwidth among low priority jobs.

As mentioned earlier, another example when a similar problem might occur is in computer networks. For example, in ATM networks there is usually some rate associated with every flow traversing the network. This rate can be either the result of negotiation with the network at setup time, as for example for Constant Bit Rate (CBR) traffic, or can be the result of a traffic management feedback control scheme as is the case for Available Bit Rate (ABR) traffic. The set of rates can be either relatively static, as for long-term CBR flows, or may change quickly in response to congestion as in the case of ABR flows.

Even if the rates are not assigned explicitly, which is the case, for example, in many packet-switching networks, different flows may be of different importance. For example, one flow may be a compound flow of data from 1000 users, while another flow may represent a single user. It may be reasonable in such case to assign weights to different flows given their relative importance. If the total demand of flows exceeds the capacity of the bottleneck resource, typically a communication link, then a possible policy is to service the congested switch to all flows proportionally to their weights just as described earlier in the example of processor sharing. This effectively assigns rates to the flows.

In recent years, rate-based scheduling disciplines at the switching points in computer networks have received a lot of attention. A comprehensive review of such schemes can be found in Hui Zhang, *Service Disciplines for Guaranteed Performance in Packet-Switching Networks*, Proceedings IEEE, October 1995.

These schemes generally are applicable at network switches and can guarantee rates assigned to the flows.

The problem of scheduling of different flows in computer networks exists not only for the switches in the network, but in host adapters as well. For example, an adapter in an ATM network must schedule different flows each having a rate associated with it. Typically, the CBR flows are serviced at a higher priority according to a pre-computed schedule. One of the disadvantages of pre-computing the CBR schedule is that because it is computed without taking any non-CBR flows into account, the service of non-CBR flows may be unnecessarily adversely affected by the CBR bursts. Pre-computing the schedule also has the disadvantage that it is computationally expensive and is usually done in software on a slow time scale. While this may be acceptable for CBR flows which only need to perform this once a new connection is established, it is not feasible if many flows with frequently changing rates need to be scheduled.

Another scheme that is known for rate-based scheduling is the so-called Leaky Bucket, described for example in The ATM Forum Traffic Management Specification Version 4.0. The scheme requires a large amount of per flow state and therefore is prohibitive for a large number of flows.

Also frequently used is the so called "time-wheel" or "calendar queue" approach. An example of the calendar queue approach may be found in Brown., R, *Calendar Queue: A fast O(1) priority queue implementation for the simulation even set problem*, Communications of the ACM, vol. 31, pp. 1220–1227. Unlike the Leaky Bucket scheme, the calendar queues are simple to implement. Unfortunately, in general the calendar queue approach cannot guarantee that the long-term average rate achieved by the flow is equal to its assigned rate.

Therefore, it is desirable to design a scheme that can be used for rate-based scheduling of flows with dynamically changing rates at networks adapters and can guarantee the assigned rate of the flow.

It is also desirable that this scheme can be used for CBR-type traffic (also known as guaranteed service in packet switching networks) and ABR-type traffic (also known as adaptive traffic) simultaneously, as well as VBR traffic (variable bit rate) in ATM networks (also known as predictive traffic in packet switching networks). Finally it is desirable that this scheme can be used in a more general context of rate-based scheduling as described earlier.

The approaches described in the paper by Hui Zhang for switch scheduling are not easily applicable to the adapters. One of the reasons for that is that most of the scheduling schemes for the switches rely on packet arrival times to the switch to determine the scheduling order of packets from different flows. The notion of arrival time is not always well-specified for the adapter, since typically the adapter requests data from the application when it is ready to transmit its data.

What is needed is a general approach to rate scheduling that will work in many different environments. In particular, the new approach should work well for network adapters as well as for network switches.

The Relative Error (RE) Scheduling approach, is a scheme that is suitable for both network adapters and network switches. In the RE method the scheduler in a shared resource receives flows (jobs) containing a plurality of cells, each of the flows having a requested flow rate. The RE scheduler schedules each of the flows received such that the sum of each of the requested flow rates of each of the flows is less than an available bandwidth in the shared resource and a relative error, computed on a per cell basis is minimized between an actual scheduling time and an ideal scheduling time relative to the interval between cell transmissions at the assigned rate of flow. The steps of receiving and scheduling are then repeated. The description of the RE method is provided in Appendix B. However, the RE scheme requires that at each iteration of the method, the scheduler finds a maximum of and updates N entries, where N is the number of jobs (flows) to be scheduled. Especially in the context of high-speed communication networks, a scheduler may need to support thousands of flows, which makes it difficult to perform the computation of such scale within a short time available for making the scheduling decision. Thus, ways of reducing the computational complexity of the Relative Error Approach are desirable. One way of achieving this goal might be to restrict the supported rates to a discrete set of rates. However, a drawback of the discrete approach is that in order to significantly reduce the computational complexity, the granularity of the discrete rates must be significantly coarse. In turn, the coarse granularity may cause the underutilization of precious network resources. Therefore, other ways of reducing the computational complexity of the Relative Error approach are needed.

SUMMARY OF THE INVENTION

A method of scheduling a plurality of data flows in a shared resource in a computer system is provided, each of the data flows containing a plurality of data cells, including the steps of providing a scheduler in the shared resource, the scheduler having a plurality of link cell slots, initializing the scheduler to receive the plurality of data flows, receiving each of the plurality of a data flows in the scheduler, each of data flows containing an assigned flow rate and a relative error rate, scheduling, by the scheduler, each of the plurality of data flows such that each of the plurality of data flows is guaranteed its assigned flow rate, and repeating the steps of receiving and scheduling.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments, which follow, when read in conjunction with accompanying drawings, wherein:

DESCRIPTION OF THE PREFERRED EMBODIMENT(S)

Figure 1:
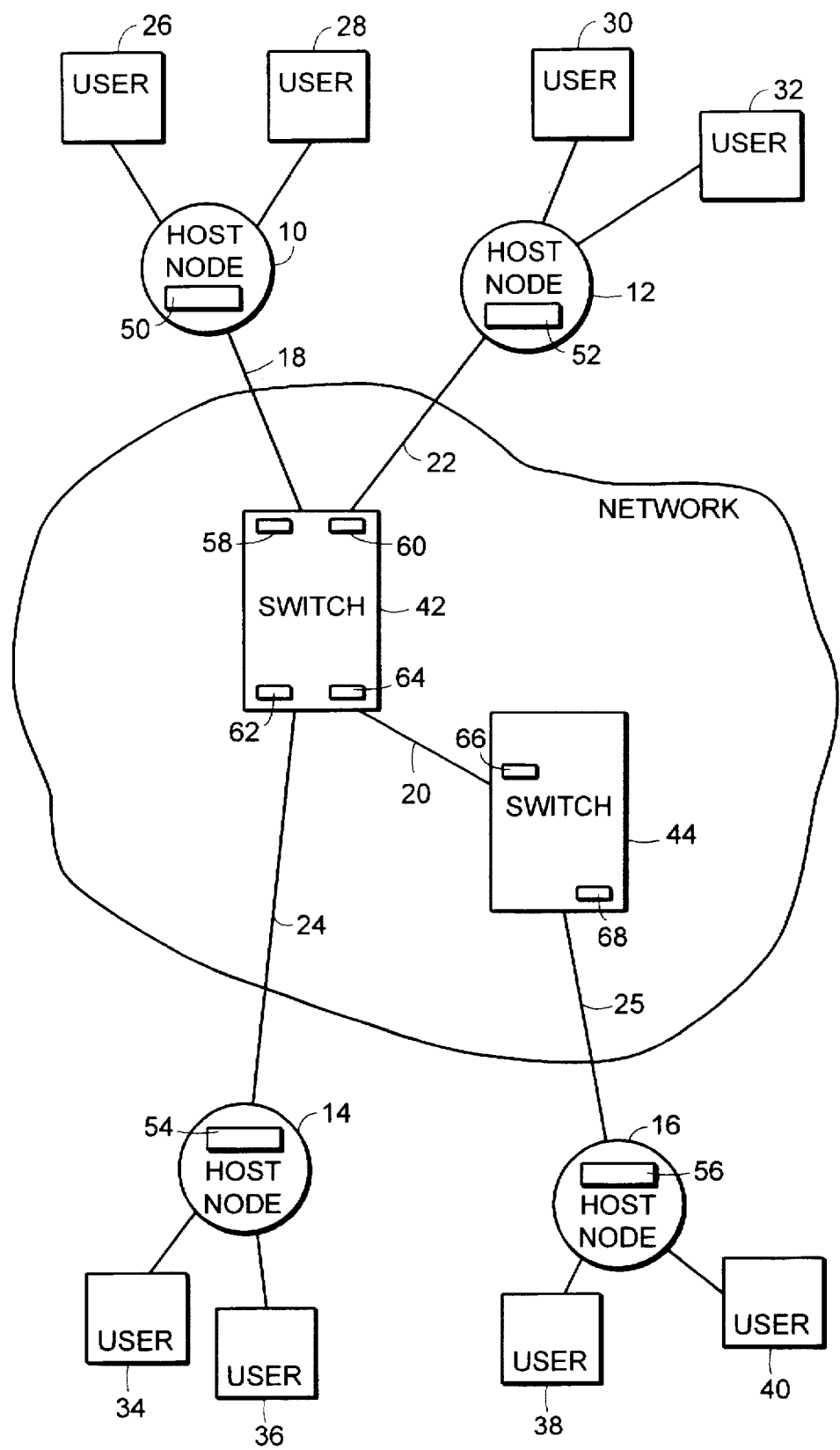
FIG. 1 is a block diagram of an exemplary computer network in which the present invention may be used.

A preferred embodiment of the present invention will be described in the context of a computer network. Referring to FIG. 1, an exemplary network is shown to include four host nodes labeled as 10, 12, 14, and 16. Each of the host nodes is also shown to be shared by a number of users. Specifically, host node 10 has users labeled as 26 and 28, host node 12 has users labeled as 30 and 32, host node 14 has users labeled as 34 and 36, and host node 16 has users labeled as 38 and 40.

The exemplary network shown if FIG. 1 also includes two switches labeled as 42 and 44, respectively. Users communicate through the network with each other. For example, user 26 at host node 10 communicates with user 36 at host node 14, user 28 at host node 10 communicates with user 38 at host node 16, and user 30, user 32 at host node 12 communicate with user 38 and user 40 at host node 16, respectively.

The host nodes are shown connected to the switches, and the switches are shown connected to each other, by way of communication links. For example, link 18 connects host node 10 to switch 42, and switches 42 and 44 are connected by a link 20. Link 22 connects host node 12 to switch 42, link 24 connects switch 42 to host node 14, and link 25 connects switch 44 to host node 16. For convenience, we shall associate the flow of data from a source to a destination with the source of this flow. For example, we shall refer to flow from user 26 to user 36 as "flow of user 26."

Each of the host nodes 10, 12, 14, and 16 are shown to include a scheduler. Specifically, host node 10 has a scheduler 50, host node 12 has a scheduler 52, host node 14 has a scheduler 54, and host node 16 has a scheduler 56. Typically, the scheduler resides in a host adapter card (not shown).

Each of the switches 42 and 44 is also shown as having a scheduler associated with each link connected to the switch. For example, switch 42 contains a scheduler 58 associated with link 18. Scheduler 60 is associated with link 22, scheduler 62 is associated with link 24, and scheduler 64 is associated with link 20. Switch 44 contains a scheduler 66 associated with link 20, while scheduler 68 is associated with link 25.

Each of the schedulers shown in FIG. 1 is responsible for scheduling different flows which share common resources within the exemplary network. By way of example, we shall assume that a limiting (or "bottleneck") resource is a link's capacity. For example, assume that all links in the network are of capacity 155 Mbs except link 20, which has capacity of 50 Mbs. Therefore, user 28, user 30, and user 32 share a common bottlenecked link, i.e., link 20. To insure fairness, each of these users can therefore transmit data at one third of the capacity of link 20, i.e., at approximately rates $R(2)=R(3)=R(4)=16.67$ Mbs. User 26 can therefore transmit data at the full remaining bandwidth of link 18, i.e., at $R(1)=138.33$ Mbs. However, any other transmission rate assignment is possible, as long as the sum of rates of user 26 and user 28 does not exceed 155 Mbs, which is the capacity of link 18, and the sum of the rates of user 28, user 30, and user 32 does not exceed 50 Mbs, which is the capacity of link 20. The average service rate that the scheduler provides to each user must be equal to the rate assigned to these users. Thus, the scheduler 50 is responsible for scheduling flows submitted to host node 10 by user 26 and user 28 at rates $R(1)$ and $R(2)$ respectively.

The present invention may reside in any of the schedulers shown in FIG. 1 and relates to a method and apparatus of rate-based scheduling and weighted fair sharing of a common resource.

By way of example, an exemplary embodiment of the present invention will be described in the context of flows in the exemplary network of FIG. 1. However, the present invention is adapted to any computer application that requires a weighted fair rate service in scheduling computer jobs. The exemplary embodiment will use an Asynchronous Transfer Mode (ATM) network as an example. ATM networks use fixed length data packets generally referred to as ATM cells. However, as mentioned above, the present invention may be generalized to variable length data packets.

Using an ATM network as a specific example, the present invention may reside in an adapter (not shown), the adapter having a scheduler (i.e., 50, 52, 54, and 56) contained in each of the host nodes 10, 12, 14, and 16, and/or in the schedulers 58, 60, 66, 62, 64 and 68 of switches 42 and 44.

The present method and apparatus builds on the ideas of the RE scheme described in Appendix B. It describes a new scheme, referred to as Hierarchical Relative Error (HRE) Scheduling. A preferred embodiment of the HRE scheme is described below which has the complexity O(log N), where N is the number of flows supported by the scheduler. This is a significant improvement over the RE scheme which had to scan the state of all jobs/flows and therefore had complexity O(N). The HRE scheme, described fully below, does not restrict the supported rates - it can operate on arbitrary assigned rates. Another feature of the HRE scheme is that, unlike the RE scheme, which operated on the relative rates, the preferred embodiment described below allows both the RE scheme and the HRE scheme to operate in absolute rates. This eliminates the necessity of rate conversion completely. The HRE scheme provides strict rate/fairness guarantees, as fully described below.

The exemplary preferred embodiment, described fully below, will be illustrated in the context of scheduling flows in ATM-like networks with fixed cell size. It is assumed that the flows which are being scheduled are assigned some rates. The rates can either be determined by the fair sharing of the resource in proportion to some assigned weights, or can be assigned as a result of some negotiation with the network. Once the rates have been assigned, the goal of the HRE scheduler is to ensure that all flows achieve their rates, and that the difference between the ideal and the actual transmission times of each cell is well-bounded.

Figure 2:
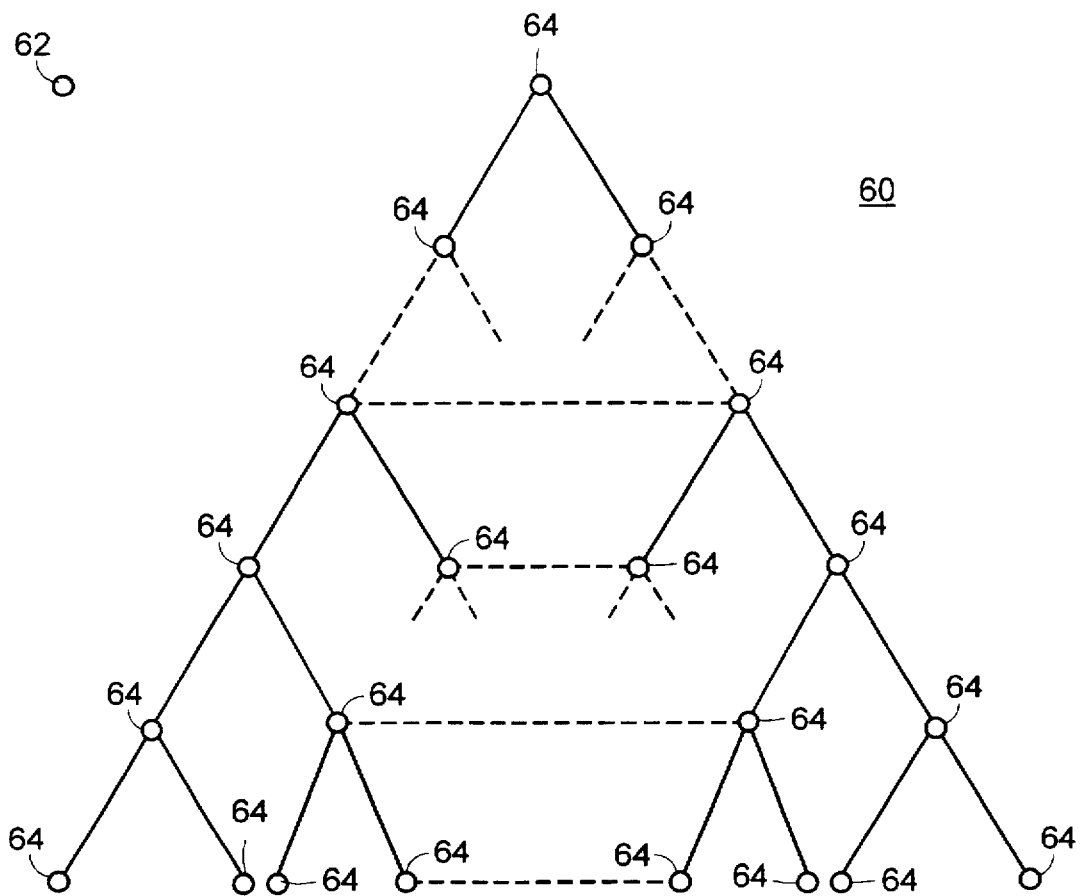
FIG. 2 is a block diagram of the main data structure used by the scheduler in accordance with the principles of the present invention.

Referring now to FIG. 2, a basic data structure used by a scheduler using the HRE scheme is shown. The data structure consists of a tree 60, referred to as the "Proportional Tree" (PT), and optionally an isolated node called a "Virtual Queue" (VQ) 62. In FIG. 2 the tree 60 is chosen to be binary. However, in general any shape of the tree 60 can be used. The worst case bounds on the discrepancy between the actual and the ideal transmission time of each cell depend on the choice of the tree shape. For simplicity, we shall assume that the tree 60 is binary in the following description.

Each node j of the tree 60, labelled generally as 64, has two variables associated with it: $R(j)$ and $D(j)$. The leaves of the tree 60 correspond to the flows being scheduled by the scheduler, while the VQ 62 corresponds to the "virtual flow" of the RE scheme as described in appendix B. For any leaf j of the tree 60 $R(j)$ is simply the assigned rate of flow j. For the Virtual Queue 62 $R(VQ)=\max(0, C-\Sigma R(j))$, where the sum is over all leaves of the tree 60. For any other node in the tree 60, $R(\text{parent})=R(\text{left\_child})+R(\text{right\_child})$. Variables $D(j)$ are analogous to the relative error terms of the RE scheme, and satisfy the condition that $D(\text{right\_sibling})+D(\text{left\_sibling})=0$. In addition, $D(VQ)+D(RPT)=0$ as well, where RPT is the root of the tree 60. Note that $R(RPT)$ is simply the sum of all rates of all real flows. If the VQ 62 is used and the sum of assigned rates of all flows does not exceed the link bandwidth, then the HRE scheme guarantees all flows their assigned rates. If the VQ 62 is not used, or the sum of assigned rates exceeds the link bandwidth, then the assigned rates of all flows are automatically scaled proportionally to link bandwidth and all flows are guaranteed its scaled assigned rate.

The concept of the HRE scheme is to determine the scheduling order of flows by applying the RE scheme hierarchically as follows. At each step the HRE scheduler uses the simple RE scheme applied to VQ 62 and RPT to determine whether a "real" flow or "virtual" flow should be scheduled. If VQ 62 is scheduled by the RE scheme, an idle cell is sent. Otherwise, the HRE scheduler applies the RE scheme to the two children of RPT to determine which branch of the tree to schedule. Once the branch is chosen, the HRE scheduler descends one level and applies the RE scheme to the children of the node chosen at the previous level. The process is repeated at each level of the tree, until a leaf is chosen for transmission. When the HRE scheduler arbitrates between any two siblings j, k, it applies the RE scheme to the two siblings as if j,k were two flows on a link of capacity $R(j)+R(k)=R(\text{Parent}(j))$. One of the main advantages of the HRE scheduler over the RE scheduler is that while RE updated state variables for all N flows at each iteration, the HRE looks at and updates only the state variables of one branch of the tree, which is log N for the binary tree.

As mentioned above, another difference from the RE scheme is that instead of using the relative rates at each application of the RE scheme, the actual rates $R(j)$ of flows j are used for the leaves. (For any non-leaf node j in the PT, the variable $R(j)$ corresponds to the sum of rates of all leaves which are descendants of node j.)

As mentioned earlier, the principle of the operation of the HRE scheme does not depend on whether the tree 60 is binary or n-ary, and whether the length of the branches are balanced or not. However, the longer the longest branch of the tree, the larger the worst case error bound can be guaranteed. One possible implementation of the tree 62 is to build a balanced binary tree for the maximum number of flows N supported by the scheduler. Flows which are not active have zero rates assigned to them. Given N, the tree can be built at initialization, for example, as illustrated in *Data Structures*, by S. Lipschuts, McGraw Hill (1986).

The following pseudocode, which sets out the invention in detail, assumes that the tree 60 is binary and is pre-built at initialization, so that leaf i corresponds to flow I. The pseudocode is only one preferred embodiment.

The following elementary operations on the tree are assumed supported by the data structure:

---

Parent(j)—returns the parent node of node j
Sibling(j)—returns the sibling of node j /* Note: Sibling(VQ) = RPT */
Lchild(j)—returns left child of node j
Rchild(j)—returns right child of node j

---

Index j is used interchangeably with G(j) to denote the corresponding node in the data structure. If flow i is not activated, it is assumed that $R(i)=0$.

```
Initialization:
    for all nodes k
        R(k)=0;
        D(k) = 0;
Add_flow(i, R(i)): /* add flow i with assigned rate R(i) */
    find leaf i corresponding to flow i
    set R(i) corresponding to the assigned rate of the flow
    /* go up Proportional Tree until reach the root PTR updating R(j),
D(j) */
    j = i;
    while (j ≠ RPT)
    {
        R(Parent(j)) = R(Parent(j)) + R(i)
        Adjust_D(j);
        j = Parent(j);
    }
    if(VQ used)
    {
        R(VQ) = max(0, R(VQ) - R(i));
        Adjust_D(VQ);
    }
Delete_flow(i, R(i)):
    find leaf i corresponding to flow i
        R(i) = 0;
    /* go up Proportional Tree until reach the root PTR updating R(j),
D(j) */
    j = i;
    while (j ≠ RPT)
    {
        R(Parent(j)) = R(Parent(j) )-R(i);
        Adjust_D(j);
    }
    if(VQ is used)
    {
        R(VQ) = R(VQ) + R(i);
        Adjust_D(VQ);
    }
HRE_Scheduler:
    do forever
    {
        /* if VQ used and if the link is not fully utilized and it is the
            turn
of VQ to send */
        if((VQ is used) && (R(VQ) > 0) && (D(VQ) > 0))
            send idle cell;
            D(VQ) = D(VQ) + R(VQ) - C; /* C is the link
bandwidth */
            D(RPT) = D(RP7) + R(RPT);
        else /* if here, PT must be scheduled */
        {
            if(VQ is used)
            {
                D(VQ) = D(VQ) + R(VQ);
                D(RPT) = D(RPT) + R(RPT) - C;
            }
            /* descend the tree */
            j = RPT;
            while j != leaf)
            {
                j = Lchild(j);
                if ((R(j) > 0) && (D(j) > 0) /* if node j active and it
is its turn */
                {
                    D(j) = D(j) + R(j) - R(Parent(j));
                    D(Sibling(j)) = D(Sibling(j)) + R(Sibling(j));
                }
                else
                {
                    D(j) = D(j) + R(j);
                    D(Sibling(j)) = D(Sibling(j)) -
R(Parent(j));
                    j = Sibling(j);
                    if (R(j) = = 0) /* sibling's turn, but sibling not
active */
                    {
                        send idle cell;
                        break;
                    }
                }
                /* here j points to the node which we have just
scheduled */
                if (j is leaf)
                {
                    if (flow j corresponding to this leaf has cell to
send)
                        send cell of j;
                    else
                        send idle cell;
                }
            }
    }
Rate_Change (i, Rnew(i)):
    find leaf i corresponding to flow i
    Rnew = Rnew(i);
    Rold = R(i);
    R(i) = Rnew(i);
    j = i;
    while (j ≠ RPT)
    {
        R(j) = Rnew(j);
        R(Parent(j)) = R(Parent(j)) - Rold + Rnew;
        Adjust_D(j);
        j = Parent(j);
    }
    /* now update D(RPT) and D(VQ) */
    if (VQ is used)
    {
        R(VQ) = max(0, R(VQ) - Rold (i) + Rnew (1));
        Adjust_D(VQ);
    }
Adjust_D(j) /* this function adjusts D(j), D(Sibling(j) so that D(j) +
D(Sibling(j)) = 0 and R(j) - R(Parent(j)) ≦ D(j) ≦ R(j) is satisfied after
the rate change */
    if (D(j) > R(j))
        D(j) = R(j);
    if(D(j) > R(j) - R(Parent(j))
        D(j) = R(j) - R(Parent(j));
    D(Sibling(j)) = -D(j);
```

The preferred embodiment, illustrated by the above detailed pseudocode, has the following property, referred to herein as Property 1:

given assigned rates R(j) and the initial conditions of variables D(j) for all nodes j satisfying R(j)–R(Parent (j))≦D(j)≦R(Parent(j)), the HRE scheme provides the following guarantees:

1) if the virtual queue VQ is used and the sum of all assigned rates R(j) does not exceed the link bandwidth then any flow j achieves rate r(j)=R(j)

2) if the virtual queue VQ is not used, or if the sum of all rates assigned R(j) exceeds the capacity of the link, then any flow then all flows achieve rates r(j) proportionally scaled up or down to the available link bandwidth so that r(i)/r(j)=R(i)/R(j) for any flows i,j and Σr(i)=C.

3) the difference between actual time A(j, n) and the ideal time B(j,n) of the n-th scheduling opportunity of flow j at its achieved rate r(j) is bounded by T(j)+cell_time(C)≦A(j)–B(j)≦T(j)(logN–1) if the Virtual Queue is not used or if R(VQ)=0 and
T(j)+cell_time(C)≦A(j)–B(j)≦T(j)(logN)) if the VQ is used and R(VQ)>0

Here T(j)=cell_length/r(j) is the ideal inter-cell interval at the achieved rate r(j) of flow, and cell_time(C) is the time to transmit one cell at link rate C.

Application to Resource Sharino Between Classes of Users

The present invention, i.e., the HRE scheme, naturally extends to sharing the resource (e.g. link or processor capacity) between classes of users. For example, in the context of the network traffic, flows can be grouped according to the requested quality of service. Suppose there are K classes of with some rates assigned to them according to some rule. Then the HRE scheduler can be applied to the classes exactly in the same way as it is applied to the individual users as described above. Scheduling inside each class can be either class-specific, or can use the HRE scheduler as well. As will be shown below, the HRE scheme guarantees that each entity it is applied to (whether it is an individual user (job, flow) or a class uniting lower-level entities) is guaranteed the rate assigned to this entity, or proportionally scaled to the available resource capacity.

Although HRE provides strict service guarantees described by Property 1 to all classes, as described it does not reallocate service opportunities unused by one class (because it had no cell available when scheduled) to other classes. If all classes require these guarantees, then this behavior is necessary. However, in practice some of the classes may tolerate large discrepancies from the ideal transmission patterns, or even not require any guarantees at all. An example of such class of service is the Unspecified Bit Rate (UBR) service in the ATM networks. In packet-switching networks this type of service is frequently referred to as elastic service. By way of example, we will use UBR as a class that does not require guarantees given by Property 1 and that would benefit from using all available scheduling opportunities. A simple modification to the HRE scheduler achieves this goal without violating any guarantees for other classes - simply send a UBR cell any time the HRE scheduler would send an idle cell. Note that all variables are modified as if an idle cell were actually sent. This ensures that cell other (guaranteed) classes still have all the guarantees of Property 1, while UBR may get more service than is guaranteed.

An optimization in the amount of storage required for the HRE Scheme

The preferred embodiment has so far assumed that at each nodej two variables D(j) and R(j) are stored and updated. However, it turns out that the storage requirements may be substantially reduced. It can be shown that the scheme always preserves two invariants:

Invariant 1: For any two children and their parent R(parent)=R(left child)+R(right child)

Invariant 2: For any two siblings of the binary tree D(right sibling)+D(left_sibling)=0.

The proof of these invariants are in Appendix A. These invariants allow to store D(j) and R(j) for only one of any two siblings (e.g. the left sibling of each pair of siblings, as for example in the example shown in FIG. 3).

Figure 3:
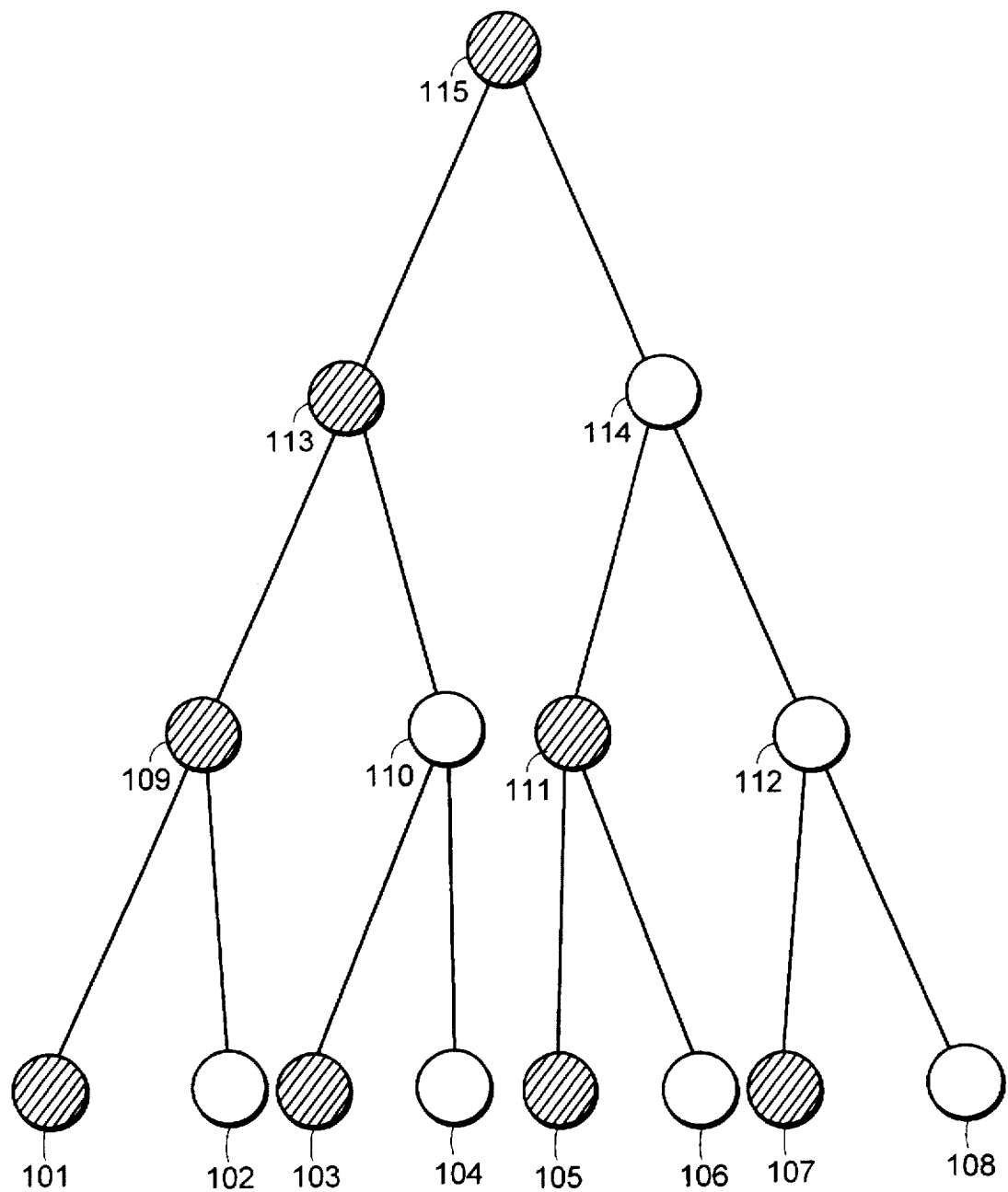
FIG. 3 is an example of how storage requirements of the preferred embodiment may be reduced.

Referring now to FIG. 3, the black nodes store the variables of D(j), R(j), while the white nodes do not. For example, consider node 112. Since 112 is a right sibling (colored white), its variables D(112), R(112) are not stored. However, they can be computed from the "black" node information as

D(112)=-D(111)

R(112)=R(114)-R(111)=R(115)-R(113)-R(111)

Thus, using Invariants 1,2 the storage requirements of the HRE scheme can be reduced by the factor of 2, and the updates of one variables of one of each two siblings can be eliminated. The modifications of the pseudocode to accommodate these changes are straightforward.

The proof of Property 1 is shown in Appendix A for completeness.

Figure 4:
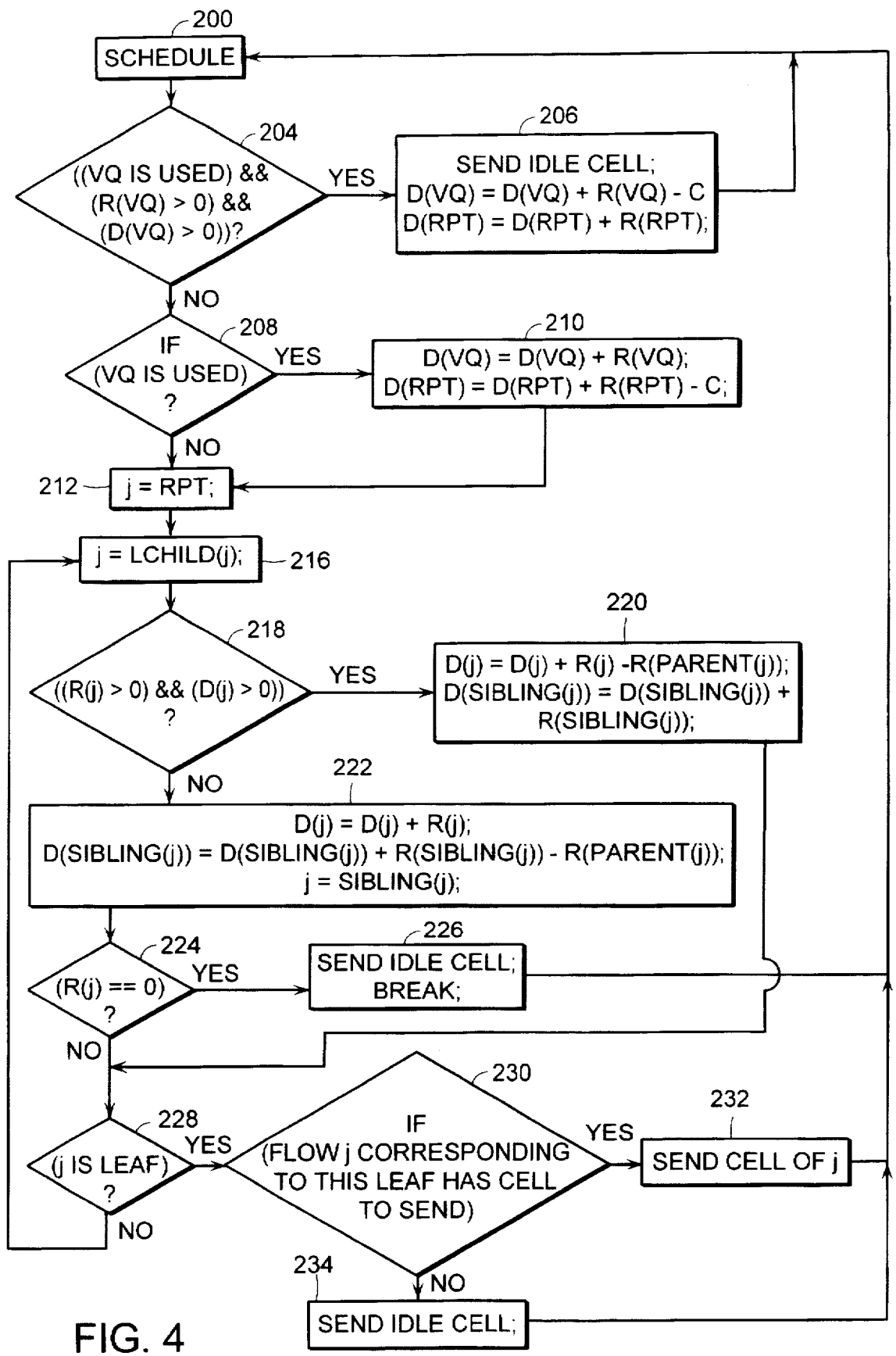
FIG. 4 is a flow chart illustrating the preferred embodiment according to the present invention.

Referring now to FIG. 4, a flow chart of the preferred embodiment of the present invention is illustrated. At step 200, the scheduler executes an initialization. During this initialization, for all nodes k, the flow rate R(k) and the relative error D(k) are set equal to zero. At step, 204, scheduling begins. At step 204, the scheduler checks to determine whether the Virtual Queue (VQ) is used and the flow rate R(VQ) is greater than zero and the relative error rate D(VQ) is greater than zero. If so, at step 206, the scheduler sends an idle cell, sets the value of the relative error rate D(VQ) to D(VQ) plus R(VQ) plus the link capacity C, and returns to step 204.

If not, at step 208, the schedule determines whether VQ is used. If so, at step 210 D(VQ) is set equal to D(VQ)+R (j)-R(Parent(j)), and then proceeds to step 212 wherej is set equal to RPT (i.e., the root of the tree). At step 216 the scheduler then determines at step 218 whether R(j) is greater than zero and D(j) is greater than zero. If so, at step 220 D(j) is set equal to D(j) plus R(j) minus R(Parent(j)). D(Sibling (j)) is set equal to D(Sibling(j)) plus R(Sibling(j)), and the process goes to step 228. If not, at step 222 D(j) is set equal to D(j) plus R(j). D(Sibling(j)) is set equal to D(Sibling(j)) plus R(Sibling(j)), and j is set equal to Sibling(j). The process then continues to step 224, where the scheduler determines whether R(j) is equal to zero. If so, at step 226 the scheduler sends an idle cell and then returns to step 202. If not, at step 228 the scheduler determines whether j is a leaf. If not, the process returns to step 202. If so, at step 230 the scheduler determines whether flow j corresponding to this leaf has a cell to send. If not, at step 234 an idle cell is sent and the process returns to step 202. If so, at step 232 a cell of j is sent and the process returns to step 202.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

APPENDIX A

Property 1 will be proved using several Lemmas given below.
For simplicity, we shall assume that variables D(j), R(j) are stored and updated for each node.
First, we prove the invariants given at the end of the previous section.
Note first that Invariant 1 holds simply by the construction of the tree: the rate of parent is always the sum of the rates of the two children.
Proof of Invariant 2:

Initially, D(j) + D(Sibling(j)) = 0) for any node j. When the HRE scheduler schedules any node j, D(j) and D(Sibling(j)) are updated as
D(j) = D(j) + R(j) - R(Parent(j))
D(Sibling(j)) = D(Sibling(j)) + R(Sibling(j))
By Invariant 1, R(Parent(j)) = R(j) + R(Sibling(j)). Therefore, each time D(j) or D(Sibling(j)) is updated, their sum is incremented by R(j) + R(Sibling(j)) - R(Parent(j)) = 0, i.e. remains unchanged.
Thus HRE_Scheduler preserves the invariant. Note finally, that Add_Flow, Delete_Flow and Change_Rate

APPENDIX A-continued also preserve this invariant.
Lemma 1 If initially for all j
$R(j) - R(Parent(j)) \leq D(j) \leq R(j)$ (1)
and rates do not change, then (1) holds for all j at any iteration of the HRE algorithm.
Proof of Lemma 1

Suppose Lemma 1 holds at some iteration for all j. Then, by Invariant 2 $D(j) + D(Sibling(j)) = 0$.
Therefore, we can assume without loss of generality that $D(j) \geq 0$, $D(Sibling(j)) \leq 0$. If at the next
iteration of the algorithm nodes j, Sibling(j) are not "visited" by the HRE scheduler, the values of D(j),
D(Sibling(j)) are unchanged. If the scheduler "visits" these nodes, then node j will be chosen (because
$D(j) \geq 0$ by assumption). Therefore $Dnew(j) = D(j) + R(j) - R(Parent(j))$, or, using Invariant 1,
$Dnew(j) = D(j) + R(j) - R(j) - R(Sibling(j)) = D(j) - R(Sibling(j))$. Therefore,
$Dnew(j) = D(j) - R(Sibling(j)) \leq D(j) \leq R(j)$
because $R(Sibling(j)) \leq 0$ and
$Dnew(j) = D(j) + R(j) - R(Parent(j)) \geq R(j) - R(Parent(j))$
because $D(j) > 0$. Therefore, (1) holds for Dnew(j) as well.
Similarly, since we assumed that (1) is statisfied at the previous iteration
$Dnew(Sibling(j)) = D(Sibling(j)) + R(Sibling(j)) \geq$
$\geq R(Sibling(j)) - R(Parent(Sibling(j))) + R(Sibling(j)) \geq R(Sibling(j)) - R(Parent(Sibling(j)))$
and
$Dnew(Sibling(j)) = D(Sibling(j)) + R(Sibling(j)) \leq R(Sibling(j))$
because $D(Sibling(j)) \leq 0$
Hence, (1) holds for Sibling(j)) as well.
Therefore, by induction HRE_Scheduler preserves the inequalities (1) for all nodes.
Finally, note that Add_flow, Delete_flow and Change_Rate explicitly ensure that (1) holds after any rate
change as
well. Since initially $D(j) = 0$ for all j, it means that (1) holds throughout the execution of the algorithm.
Lemma 2 Consider any two nodes j, Sibling(j) in the PT. Assume that the rates of flows are unchanged
and that initial conditions are variables D(j) and D(Sibling(j)) satisfy Invariant 2 for all j.
Denote by Dn(k) the value of D(k) after the n-th update. Denote D0(k) the initial conditions on variable
D(k). Consider the non-heirarchical RE scheme with relative error variables $\vartheta(k, n)$ operating on two
flows with rates R(j), R(Sibling(j)) sharing a link of bandwidth $R(Parent(j)) = R(j) + R(Sibling(j))$ with
initial conditions $\vartheta(k, 0) = D0(k)/R(Parent(k))$. Then for $k = j$, $Sibling(j)$, $Dn(k) = R(Parent(k)) \vartheta(k)$.
Lemma 2 says that the sequence of the values of variables D(j) obtained by the HRE for any node j is
indistinguishable from the values of variables of the RE scheme operating on j and its sibling in isolation,
scaled by the factor $R(j) + R(Sibling(j))$.
Proof of Lemma 2

The values of $\vartheta(k)$ for the non-hierarchical RE scheme operating on the link of capacity
$R(Parent(j)) = R(j) + R(Sibling(j))$ are updated as follows:

$\vartheta(k, n) = \vartheta(k) + w(k) - 1$ if flow k scheduled (2)

$\vartheta(k, n) = \vartheta(k) + w(k)$ otherwise (3)
where $w(k) = R(k)/R(Parent(j))$ (see Appendix B for the description of the RE_Scheduler, also fully
described in copending application PD96-0071)
Multiplying both sides of (2), (3) by R(Parent(k)) and denoting $Dn(k) = R(Parent(k)) \vartheta(k, n)$, we obtain
the update formulas for Dn(k) as:
$D(n) (k) = Dn(k) + R(k) - R(Parent(k))$ if flow k scheduled (4)
$D(n) (k) = Dn(k) + R(k)$ otherwise (5)
which are the update formulas given by the HRE_Scheduler. QED.
Lemma 3. Consider the non-hierarchical RE scheme. Consider two flows j, k with rates R(j), R(k)
operating on a link of capacity $C = R(j) + R(k)$. Assume that at time zero the initial conditions on the
variables $\vartheta(j,n)$ satisfy Invariant 2. Denote A(j,m) the beginning of the actual transmission time of the m-
th cell of flow j under the RE scheduler. Denote B(m,j) the beginning of the "ideal" transmission time of
the m-th cell of flow j assuming that $B(j,0) = -Dinit(j)/T(j)$, where $T(j) = cell\_len/R(j)$. Then for all m
$-T(j) + cell\_time(C) \leq A(j,m) - B(j,m) \leq cell\_time(C)$ (6)
where cell_time(C) is the time of transmission of one cell over the link of capacity C.
Proof of Lemma 3.

This Lemma is a special case of Property 1 of Atty. Dkt. No. PD96-0071.
Lemmas 1 and 2 imply that for the non-hierarchical RE scheme operating on only two flows j,k sharing a
link of capacity $C = R(j) + R(k)$,
$R(j)/C - 1 \leq \vartheta(j,n) \leq R(j)/C$ (7)
Noting that $R(j)/C = cell\_time(C)/T(j)$, and recalling that for the cell scheduled by the non-hierarchical
RE Scheduler at some link cell slot
$\vartheta(j,n) = (A(j,m) - B(j,m))/T(j)$ by definition, (6) can be immediately obtained from (7). QED.
Lemma 4. The non-hierarchical RE scheme with iterative equations
$D(j, n + 1) = D(j,n) + R(j) - \Sigma R(j)$ if flow j scheduled (8)
$D(j, n + 1) = D(j,n) + R(j)$ otherwise (9)
operating on flows $j = 1, 2, \ldots k$. with rates R(j) on the link of capacity C and initial conditions Dinit(j)
is
equivalent to the operation of the non-hierarchical RE scheme with iterative equations (2), (3) operating
on flows j with rates $r(j) = R(j)C/\Sigma R(j)$ with initial conditions $\vartheta init(j) = Dinit(j)/\Sigma R(j)$ on the link of
capacity C.
That is, equations (8), (9) can be used in the non-hierarchical RE scheme to provide on-line proportional
scaling of the rates up or down to the available bandwidth of the link without converting the absolute
rates
to the relative rates as in Atty. Dkt. Nos. PD96-0071 and PD96-0076.

APPENDIX A-continued

Proof of Lemma 4.

Consider the non-hierarchical RE scheme with its relative error variables denoted $\vartheta(j)$ to distinguish them from variables $D(j)$ in (8),(9). The update formulas for $\vartheta(j)$ $\vartheta(j) = \vartheta(j) + w(j) - 1$ if flow $j$ scheduled $\vartheta(j) = \vartheta(j) + w(j)$ otherwise Here $w(j) = r(j)/C$, where $r(j) = R(j)C/\Sigma R(j)$ are the assigned rates $R(j)$ proportionally scaled up or down to achieve $\Sigma r(j) = C$. Therefore, the update formulas can be rewritten as $\vartheta(j) = \vartheta(j) + R(j)/\Sigma R(j) - 1$ if flow $j$ scheduled $\vartheta(j) = \vartheta(j) + R(j)/\Sigma R(j)$ otherwise Multiplying both sides by $\Sigma R(j)$ and denoting $D(j) = \vartheta(j) \Sigma R(j)$ we immediately obtain (8),(9). Therefore, by operation of the algorithm the same scheduling decisions will be made in both cases, QED. Lemma 4 allows to use unconverted rates for the RE and the HRE scheduler.

Proof of Property 1 of the HRE Scheme.

Consider first when $R(VQ) = 0$ (or VQ is not used), and that $\Sigma R(j) = C$. This case corresponds to pre-scaled rates, and PTR is scheduled every link cell slot cell_time(C). Without loss of generality assume that the initial time is zero.

Let Dinit(j) be the initial conditions on $D(j)$, satisfying (1) for any node $j \neq$ PTR. At the beginning of every
link cell slot the HRE_Scheduler traverses one of the tree branches from root to leaf, making a decision at
each level m by applying the non-hierarchical RE scheduler to the two siblings at this level. We shall say that a scheduling opportunity of node $j$ occurs when node $j$ is chosen by the scheduler. Let $A(j,n)$ denote the actual time of the beginning of the n-th scheduling opportunity of node $j$. Let $B(j,n)$ denote the ideal time of the beginning of the n-th scheduling opportunity of node $j$ at rate $R(j)$. Then $B(j,n) = B(j,0) + nT(j)$, where $T(j) = \text{cell\_len}/R(j)$ and) $B(j,0)$ is chosen so that $B(j,0) = -\text{Dinit}(j)T(j)$. That is, $B(j,0)$ is the time the very first scheduling opportunity should have occurred to accumulate relative error Dinit(j) by time zero.

Recall that by Lemmas 2 and 4 the sequence of scheduling decisions HRE scheme on arbitrating between any pair of siblings $j$, Sibling $(j)$ is indistinguishable from the sequence of scheduling decisions of the non-
hierarchical RE scheme operating on $j$, Sibling $(j)$ in on a link of capacity $R(\text{Parent}(j))$. Although the sequences of decisions are equivalent, the actual time of decisions may be different for the HRE scheme compared to the non-hierarchical RE scheme operating on the two nodes in isolation. Note, however, that these times would be identical if Parent(j) were scheduled exactly at its ideal times $B(\text{Parent}(j),n) = B(\text{Parent}(j), 0) + nT(\text{Parent}(j))$.

Denote $\acute{A}(j,n)$ the time of what the actual n-th scheduling opportunity of node $j$ should have been, if Parent(j) were always scheduled at its ideal time, and denote $A(j,n)$ the actual time of the n-th scheduling opportunity of $j$ under the HRE scheme. Then, $A(j,n)$ differs from $\acute{A}(j,n)$ by the absolute error of the time of corresponding scheduling opportunity of Parent(j) compared to the parent's ideal scheduling time. That is, denoting by p the sequence number of the scheduling opportunity of Parent(j) corresponding to the n-th scheduling opportunity of $j$, we can write $A(j,n) = \acute{A}(j,n) + A(\text{Parent}(j),p) - B(\text{parent}(j),p)$ (10)

By Lemma 3 for any $j \neq$ PTR, any n, and p corresponding to n $-T(j) + \text{cell\_time}(R(\text{Parent}(j)) \leq \acute{A}(j,n) - B(j,n) \leq \text{cell\_time}(R(\text{Parent}(j)))$ (11)

adding $A(\text{Parent}(j),p) - B(\text{Parent}(j),p)$ to all sides of (11) and substituting (10) into (11) we get $-T(j) + \text{cell\_time}(R(\text{Parent}(j))) + A(\text{Parent}(j),p) - B(\text{Parent}(j),p) \leq A(j,n) - B(j,n) \leq$ (12)
$\leq \text{cell\_time}(R(\text{Parent}(j))) + A(\text{Parent}(j),p - B(\text{Parent}(j),p)$ Consider any leaf and the branch of the tree going from the leaf up to the root. Denote the nodes of the nodes of this branch by $k(1), k(2), \ldots k(\log N)$, where node $k(1)$ corresponds to the leaf and $k(\log N)$ corresponds to the root (PTR). Noting that $\text{cell\_time}(R(\text{Parent}(k(i)))) = T(k(i + 1))$ by definition, we can apply recursively (12) to itself going uptree from $k(1)$ to $k(\log N - 1)$, which yeilds $$-\sum_{i=1}^{\log N - 1} T(k(i)) + \sum_{i=2}^{\log N} T(k(i)) \leq A(k(1)) - B(k(1)) \leq \sum_{i=2}^{\log N} T(k(i))$$ (13)

or, noting that $T(k(\log N)) = \text{cell\_time}(C)$ $$-T(k(1)) + \text{cell\_time}(C) \leq A(k(1)) - B(k(1)) \leq \sum_{i=2}^{\log N} T(k(i))$$ (14)

Note also, that $T(k)$ is a non-increasing function of i, since the rate of the parent is at least as large as the rate of the child. Therefore, (14) can be used to obtain a looser bound for any leaf $j$ $-T(j) + \text{cell\_time}(C) \leq A(j) - B(j) \leq T(j)(\log N - 1)$ (15)

Since the absolute error of the actual transmission time of any flow $j$ (corresponding to a leaf of the tree) is
bounded by (14) or (15), any flow is guaranteed its rate $R(j)$. This completes the proof of Property 1 for the case when the sum of all assigned rates is equal to the link bandwidth.

Consider now the case when the sum of assigned rates is less than the link bandwidth and the Virtual Queue is used, the Virtual Queue can be treated as the root of a "virtual subtree", so that if any leaf of the "virtual subtree" is scheduled, an idle cell is sent. Then the VQ and the root of the proportional tree can be
treated as siblings in a tree obtained from the data structure in FIG. 1 by adding one more top-level node with rate equal to the link bandwidth. Repeating exactly the same argument as above on the tree with $\log N + 1$ levels we prove Property 1 for this case as well.

Finally, if the virtual queue is not used, note that Lemmas 2 and 4 imply that we could have gotten an

APPENDIX A-continued equivalent result by pre-scaling the rates so that the sum of all rates is equal to the link bandwidth.
Since Property 1 has been proved for the case of pre-scaled rates, the proof of Property 1 for this case is complete. QED.

APPENDIX B

The following variables are used in the RE_Scheme
D(i,j) error term for flow i at link cell slot j
R(i) rate of flow i (i = 0 corresponds to the "virtual flow" (fully described below), whose rate is simply the difference between the available bandwidth C and the sum of rates of all real flows
i = 1,2, ... N.
w(i) rate of flow i relative to the total available bandwidth C
Note: R(i) are required for initialization and rate changes only, and do not need to be stored in per flow state. Variables w(i) and D(i,j) are stored per flow.
Initialization of the procedure RE_Scheduler occurs in the following manner:
j = 0;

$$R(0) = C - \sum_{i>0} R(i)$$

for all i
{
w(i) = R(i)/C;
D(i,0) = 0;
}
The RE scheduler operates as described in the following pseudocode.
RE_Scheduler:
do forever
{
find flow f with D(f,j) = max_{i}D(i,j)
if ((f > 0) AND (cell of flow f available))
transmit next cell from flow f
else do not transmit (transmit an idle cell)
j = j + 1;
D(f,j) = D(f,j) + w(f) − 1;
for all i ≠ f
D(i,j) = D(i,j) + w(i);
−}

What is claimed is:

1. A method of scheduling data flows in a shared resource in a computer system, each of the data flows containing data cells, comprising the steps of:

receiving the data flows, each of the data flows containing an assigned flow rate and a relative error rate;

transmitting, each of the data flows such that each of the data flows is maintained at its assigned flow rate, comprising the steps of:

applying a relative error method to a virtual queue and to a root of a proportional tree structure in a memory to determine whether a real flow or a virtual flow should be scheduled;

sending an idle cell if the virtual queue is scheduled by the relative error method;

applying the relative error method to a root of a proportional tree in the memory to determine which branch of the proportional tree to schedule;

applying the relative error method to each of the two children of a node in the proportional tree which is chosen for transmission;

applying the relative error method to the two children such that a link capacity of a left child flow rate and a right child flow rate is equal to a flow rate of the parent.

2. The method of scheduling data flows in a shared resource in a computer system according to claim 1 wherein the relative error method comprises the step of:

transmitting, each of the data flows such that a sum of each of the predetermined flow rates of each of the data flows is less than an available bandwidth in the shared resource and a relative error is reduced between an actual scheduling time and an ideal scheduling time on a per cell basis comprising the steps of determining whether a data flow and a cell of the data flow are available;

sending a null cell if the step of determining determines that said data flow and said cell of the data flow are unavailable;

sending said cell if the step of determining determines that said flow and said cell of the data flow are available;

incrementing said link cell slot;

setting the error term for said data flow at said link cell slot equal to the error term for the data flow at the link cell slot plus the rate of data flow relative to the total available bandwidth minus 1; and for all rates of data flow not equal to the rate of flow, the error term for the data flow at the link cell slot is set equal to the error term for the flow at link cell slot plus a rate of flow relative to the total available bandwidth.

3. The method of scheduling a plurality of data flows in a shared resource in a computer system according to claim 2 wherein the step of scheduling comprises the steps of:

determining whether a data flow and a cell of the data flow are available;

sending a null cell if the step of determining determines that said data flow and said cell of the data flow are unavailable;

transmitting said cell if the step of determining determines that said data flow and said cell of the data flow are available;

incrementing said link cell slot;

setting an the error term for said data flow at said link cell slot equal to the error term for the data flow at the link cell slot plus the rate of data flow relative to the total available bandwidth minus 1; and for all rates of data flow not equal to the rate of flow, the error term for the data flow at the link cell slot is set equal to the error term for the flow at link cell slot plus a rate of flow relative to the total available bandwidth.

4. A method of scheduling data flows in a shared resource in a computer system, each of the data flows containing data cells, comprising the steps of:

receiving the data flows, each of the data flows containing an assigned flow rate and a relative error rate;

transmitting, each of the data flows using a hierarchical relative error method such that the rate achieved by each of the data flows is maintained at its assigned rate of flow.

* * * * *